US009954722B2

(12) United States Patent
Masterlark

(10) Patent No.: US 9,954,722 B2
(45) Date of Patent: Apr. 24, 2018

(54) METHOD AND APPARATUS FOR RESOURCE DEPENDENCY PLANNING

(71) Applicant: Nuclear Safety Associates, Inc., Charlotte, NC (US)

(72) Inventor: James Masterlark, River Falls, WI (US)

(73) Assignee: Atkins Nuclear Solutions US, Inc., Charlotte, NC (US)

( * ) Notice: Subject to any disclaimer, the term of this patent is extended or adjusted under 35 U.S.C. 154(b) by 783 days.

(21) Appl. No.: 13/911,715

(22) Filed: Jun. 6, 2013

(65) Prior Publication Data

US 2014/0365268 A1    Dec. 11, 2014

(51) Int. Cl.
| | |
|---|---|
| *G06F 15/173* | (2006.01) |
| *H04L 12/24* | (2006.01) |
| *G06Q 10/06* | (2012.01) |
| *G06F 11/14* | (2006.01) |
| *G06F 11/00* | (2006.01) |
| *G06Q 20/10* | (2012.01) |
| *G06Q 30/06* | (2012.01) |

(52) U.S. Cl.
CPC ........ *H04L 41/0631* (2013.01); *G06F 11/008* (2013.01); *G06F 11/1474* (2013.01); *G06Q 10/0635* (2013.01); *G06Q 10/06313* (2013.01); *G06Q 20/10* (2013.01); *G06F 2201/82* (2013.01); *G06Q 30/06* (2013.01)

(58) Field of Classification Search
None
See application file for complete search history.

(56) References Cited

U.S. PATENT DOCUMENTS

| | | | | |
|---|---|---|---|---|
| 5,500,940 | A * | 3/1996 | Skeie | G06F 11/22 714/25 |
| 6,154,849 | A * | 11/2000 | Xia | H04L 12/2697 709/220 |
| 7,669,087 | B1 * | 2/2010 | Johnsen | G06F 11/008 714/13 |
| 9,274,903 | B1 * | 3/2016 | Garlapati | G06F 11/2002 |
| 2004/0068501 | A1 * | 4/2004 | McGoveran | G06F 11/1474 |
| 2006/0155564 | A1 * | 7/2006 | Fisher | G06Q 10/06 705/7.11 |
| 2006/0294507 | A1 * | 12/2006 | Buskens | G06F 11/1417 717/133 |
| 2007/0097880 | A1 * | 5/2007 | Rajsic | H04L 41/12 370/254 |

(Continued)

*Primary Examiner* — Gurkanwaljit Singh
(74) *Attorney, Agent, or Firm* — Alston & Bird LLP

(57) ABSTRACT

Systems, methods, apparatuses, and computer readable media are disclosed for resource dependency planning. A method is provided for resource dependency planning including receiving resource dependency logic. The resource dependency logic may define a dependency relationship among a plurality of resources. The method may also include receiving a set of resource input data. The resource input data may indicate a status of at least one of the plurality of resources. The method may further include determining a status of each of the plurality of resources based on the set of resource input data and the resource dependency logic, and providing the status of the plurality of the plurality of resources via a resource dependency planning interface. Various other means including a system, apparatus, and computer readable medium are also disclosed.

27 Claims, 8 Drawing Sheets

(56) References Cited

U.S. PATENT DOCUMENTS

| | | | |
|---|---|---|---|
| 2007/0282649 A1* | 12/2007 | Davis | G06F 11/008 700/29 |
| 2008/0183944 A1* | 7/2008 | Thornton | G06F 9/461 711/6 |
| 2008/0270210 A1* | 10/2008 | Kratschmer | G06Q 10/06 705/7.28 |
| 2009/0171707 A1* | 7/2009 | Bobak | G06Q 10/06 705/7.23 |
| 2013/0041924 A1* | 2/2013 | Vernier | G06Q 10/06 707/798 |
| 2013/0097304 A1* | 4/2013 | Asthana | H04L 41/5025 709/224 |

* cited by examiner

METHOD AND APPARATUS FOR RESOURCE DEPENDENCY PLANNING

FIELD

Embodiments discussed herein are related to abnormal event planning and, more particularly, to systems, methods, apparatuses, computer readable media and other means for generating response plans based on the status of one or more resources.

BACKGROUND

As technology has advanced, humanity is increasingly reliant on facilities that pose some risk in operation. Although power plants, factories, ports, and other industrial facilities provide a great benefit to society, such facilities typically require dangerous chemicals and equipment in order to provide these benefits. As a result, an accident or natural disaster at one of these facilities may endanger employees and other individuals located nearby. The facilities may include many interdependent resources, including resources that are dependent upon other resources to function. In general, the more complex the facility, the more interrelated these resources are, often with multiple redundancies to allow the facility to continue functioning in the event of a resource failure. A number of deficiencies and problems associated with planning for the effect of certain abnormal events on these resources are identified herein. Through applied effort, ingenuity, and innovation, exemplary solutions to many of these identified problems are embodied by the present invention, which is described in detail below.

BRIEF SUMMARY

Systems, methods, apparatuses, and computer readable media are disclosed for resource dependency planning. Embodiments may include a computer-implemented method for resource dependency planning. The computer-implemented method may include receiving resource dependency logic. The resource dependency logic may define a dependency relationship among a plurality of resources. The method may also include receiving a set of resource input data. The resource input data may indicate a failure of at least one of the plurality of resources. The method may also include determining, using a processor, an impact of the failure on at least one failed resource of the plurality of resources using the resource dependency logic. The impact may be determined by assigning a resource status value to the failed resource indicative of the failure, evaluating a status of one or more resources of the plurality of resources using the resource status value of the failed resource, and determining the impact based on the evaluated status. The method may further include determining, based on the impact of the failure, a remediation plan for addressing the failure, and providing the remediation plan via a resource dependency planning interface. The remediation plan may be provided in response to selection of an icon associated with the failed at least one resource from within the resource dependency planning interface. The plurality of resources may include at least one of an equipment, a component, a system, a functionality, a route, or a municipal service. The method may also include providing a logic editing interface to edit the resource dependency logic. The method may include receiving a modification to the resource dependency logic via the logic editing interface, and updating the impact of the failure based on the modification to the resource dependency logic. The failure may be identified based on a failure of one or more dependencies upon which the failed resource depends. The remediation plan may include procedures for addressing the failure of the one or more dependencies upon which the failed resource depends. In some embodiments, the resource input data includes information provided by one or more facility sensors. The failure may be identified as an internal failure of the failed resource, and the remediation plan may include at least one of procedures for repairing the failed resource or procedures for replacing the failed resource. The resource input data may be provided via the resource dependency planning interface.

Embodiments may also include an apparatus for resource dependency planning comprising at least one memory coupled to at least one processor, the at least one memory comprising instructions that, when executed by the processor, cause the processor to configure the apparatus. The processor may configure the apparatus to receive resource dependency logic. The resource dependency logic may define a dependency relationship among a plurality of resources. The processor may also configure the apparatus to receive a set of resource input data. The resource input data may indicate a failure of at least one of the plurality of resources. The processor may further configure the apparatus to determine an impact of the failure on at least one failed resource of the plurality of resources using the resource dependency logic by assigning a resource status value to the failed resource indicative of the failure, evaluating a status of one or more resources of the plurality of resources using the resource status value of the failed resource, and determining the impact based on the evaluated status. The processor may also configure the apparatus to determine, based on the impact of the failure, a remediation plan for addressing the failure, and provide the remediation plan via a resource dependency planning interface. The remediation plan may be provided in response to selection of an icon associated with the failed at least one resource from within the resource dependency planning interface. The plurality of resources may include at least one of an equipment, a component, a system, a functionality, a route, or a municipal service. The instructions may further cause the processor to configure the apparatus to provide a logic editing interface to edit the resource dependency logic. The instructions may also cause the processor to configure the apparatus to receive a modification to the resource dependency logic via the logic editing interface, and update the impact of the failure based on the modification to the resource dependency logic. The failure may be identified based on a failure of one or more dependencies upon which the failed resource depends. The remediation plan may include procedures for addressing the failure of the one or more dependencies upon which the failed resource depends. The resource input data may include information provided by one or more facility sensors. The failure may be identified as an internal failure of the failed resource, and wherein the remediation plan further comprises at least one of procedures for repairing the failed resource or procedures for replacing the failed resource. The resource input data may be provided via the resource dependency planning interface.

Embodiments may also include a non-transitory computer readable storage medium comprising computer-readable instructions that, when executed by a processor, cause the processor to configure an apparatus. The instructions may cause the processor to configure the apparatus to receive resource dependency logic. The resource dependency logic may define a dependency relationship among a plurality of resources. The instructions may also cause the processor to configure the apparatus to receive a set of resource input data. The resource input data may indicate a failure of at least one of the plurality of resources. The instructions may further cause the processor to configure the apparatus to determine an impact of the failure on at least one failed resource of the plurality of resources using the resource dependency logic by assigning a resource status value to the failed resource indicative of the failure, evaluating a status of one or more resources of the plurality of resources using the resource status value of the failed resource, and determining the impact based on the evaluated status. The instructions may also cause the processor to configure the apparatus to determine, based on the impact of the failure, a remediation plan for addressing the failure, and to provide the remediation plan via a resource dependency planning interface. The remediation plan may be provided in response to selection of an icon associated with the failed at least one resource from within the resource dependency planning interface. In some embodiments, the plurality of resources include at least one of an equipment, a component, a system, a functionality, a route, or a municipal service. The instructions may further cause the processor to configure the apparatus to provide a logic editing interface to edit the resource dependency logic. The instructions may also cause the processor to configure the apparatus to receive a modification to the resource dependency logic via the logic editing interface, and to update the impact of the failure based on the modification to the resource dependency logic. The failure may be identified based on a failure of one or more dependencies upon which the failed resource depends. In some embodiments, the remediation plan comprises procedures for addressing the failure of the one or more dependencies upon which the failed resource depends. The resource input data may include information provided by one or more facility sensors. The failure may be identified as an internal failure of the failed resource, and the remediation plan may include at least one of procedures for repairing the failed resource or procedures for replacing the failed resource. The resource input data may be provided via the resource dependency planning interface.

Embodiments may also include yet another computer-implemented method for resource dependency planning. The method may include receiving resource dependency logic. The resource dependency logic may define a dependency relationship among a plurality of resources. The method may further include receiving a set of resource input data. The resource input data may indicate a status of at least one of the plurality of resources. The method may also include determining, using a processor, a status of each of the plurality of resources based on the set of resource input data and the resource dependency logic, and providing the status of the plurality of the plurality of resources via a resource dependency planning interface. The method may further include receiving a change in a status of at least one of the plurality of resources, determining an impact of the change on the plurality of resources using the resource dependency logic, and updating the resource dependency planning interface to reflect the impact of the change. The status of each of the plurality of resources may be represented as a variable, and wherein the method may include determining the status of the resources by identifying a maximum value of a set of variables representing the status of resources upon which a particular resource has an independent dependency. The status of each of the plurality of resources may be represented as a variable, and the method may include determining the status of the resources by identifying the minimum value of a set of variables representing the status of resources upon which a particular resource has an redundant dependency. The variable may have a lower value for an operational resource than a value for a resource in a failed state.

Embodiments may also include another apparatus for resource dependency planning. The apparatus may include at least one memory coupled to at least one processor, the at least one memory comprising instructions that, when executed by the processor, cause the processor to configure the apparatus. The instructions may cause the processor to configure the apparatus to receive resource dependency logic. The resource dependency logic may define a dependency relationship among a plurality of resources. The instructions may further cause the processor to configure the apparatus to receive a set of resource input data. The resource input data may indicate a status of at least one of the plurality of resources. The instructions may further cause the processor to configure the apparatus to determine a status of each of the plurality of resources based on the set of resource input data and the resource dependency logic, and to provide the status of the plurality of the plurality of resources via a resource dependency planning interface. In some embodiments, the processor may further configure the apparatus to receive a change in a status of at least one of the plurality of resources, determine an impact of the change on the plurality of resources using the resource dependency logic; and update the resource dependency planning interface to reflect the impact of the change. The status of each of the plurality of resources may be represented as a variable, and the processor may further configure the apparatus to determine the status of the resources by identifying a maximum value of a set of variables representing the status of resources upon which a particular resource has an independent dependency. The status of each of the plurality of resources may be represented as a variable, and the processor may further configure the apparatus to determine the status of the resources by identifying the minimum value of a set of variables representing the status of resources upon which a particular resource has an redundant dependency. The variable may have a lower value for an operational resource than a value for a resource in a failed state.

Embodiments may also provide yet another non-transitory computer readable storage medium. The computer readable storage medium may include computer-readable instructions that, when executed by a processor, cause the processor to configure an apparatus. The instructions may cause the processor to configure the apparatus to receive resource dependency logic. The resource dependency logic may define a dependency relationship among a plurality of resources. The instructions may also cause the processor to configure the apparatus to receive a set of resource input data. The resource input data may indicate a status of at least one of the plurality of resources. The instructions may further cause the processor to configure the apparatus to determine a status of each of the plurality of resources based on the set of resource input data and the resource dependency logic, and to provide the status of the plurality of the plurality of resources via a resource dependency planning interface. The instructions may further cause the processor to configure the apparatus to receive a change in a status of at least one of the plurality of resources, determine an impact of the change on the plurality of resources using the resource dependency logic, and update the resource dependency planning interface to reflect the impact of the change. The status of each of the plurality of resources may be represented as a variable, and the instructions may further cause the processor to configure the apparatus to determine the status of the resources by identifying the maximum value of a set of variables representing the status of resources upon which a particular resource has an independent dependency. The status of each of the plurality of resources may be represented as a variable, and the instructions may further cause the processor to configure the apparatus to determine the status of the resources by identifying the minimum value of a set of variables representing the status of resources upon which a particular resource has an redundant dependency. The variable may have a lower value for an operational resource than a value for a resource in a failed state.

Embodiments may also include yet another computer-implemented method for resource dependency planning. The method may include assigning a status variable to a first resource, the status variable indicating an operational state of the resource. The method may also include generating a set of resource dependency logic for modifying the status variable based on one or more status variables associated with resources upon which the first resource depends, modifying, using a processor, the status variable for the first resource based on the resource dependency logic and a received resource status for the resources upon which the first resource depends, and providing a representation of the modified status variable via a resource planning interface. The resource dependency logic may define one or more formulae for processing the status variables associated with resources upon which the first resource depends to modify the status variable for the first resource. The one or more formulae may include performing at least one of a max( ) or logical OR operation on the status variables for each resource upon which the first resource has an independent dependency. The one or more formulae may also or alternatively include performing at least one of a min( ) or logical AND operation on the status variables for each resource upon which the first resource has a redundant dependency.

Yet further embodiments may provide an apparatus for resource dependency planning comprising at least one memory coupled to at least one processor, the at least one memory comprising instructions that, when executed by the processor, cause the processor to configure the apparatus. The instructions may cause the processor to configure the apparatus to assign a status variable to a first resource, the status variable indicating an operational state of the resource, to generate a set of resource dependency logic for modifying the status variable based on one or more status variables associated with resources upon which the first resource depends, to modify the status variable for the first resource based on the resource dependency logic and a received resource status for the resources upon which the first resource depends, and to provide a representation of the modified status variable via a resource planning interface. The resource dependency logic may define one or more formulae for processing the status variables associated with resources upon which the first resource depends to modify the status variable for the first resource. The one or more formulae may include performing at least one of a max( ) or logical OR operation on the status variables for each resource upon which the first resource has an independent dependency. In some embodiments, the one or more formulae additionally or alternatively may include performing at least one of a min( ) or logical AND operation on the status variables for each resource upon which the first resource has a redundant dependency.

Embodiments may also include another non-transitory computer readable storage medium. The computer readable storage medium may include computer-readable instructions that, when executed by a processor, cause the processor to configure an apparatus to assign a status variable to a first resource, the status variable indicating an operational state of the resource, to generate a set of resource dependency logic for modifying the status variable based on one or more status variables associated with resources upon which the first resource depends, to modify the status variable for the first resource based on the resource dependency logic and a received resource status for the resources upon which the first resource depends, and to provide a representation of the modified status variable via a resource planning interface. The resource dependency logic may define one or more formulae for processing the status variables associated with resources upon which the first resource depends to modify the status variable for the first resource. In some embodiments, the one or more formulae may include performing at least one of a max( ) or logical OR operation on the status variables for each resource upon which the first resource has an independent dependency. In additional or alternative embodiments, the one or more formulae include may include performing at least one of a min( ) or logical AND operation on the status variables for each resource upon which the first resource has a redundant dependency.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
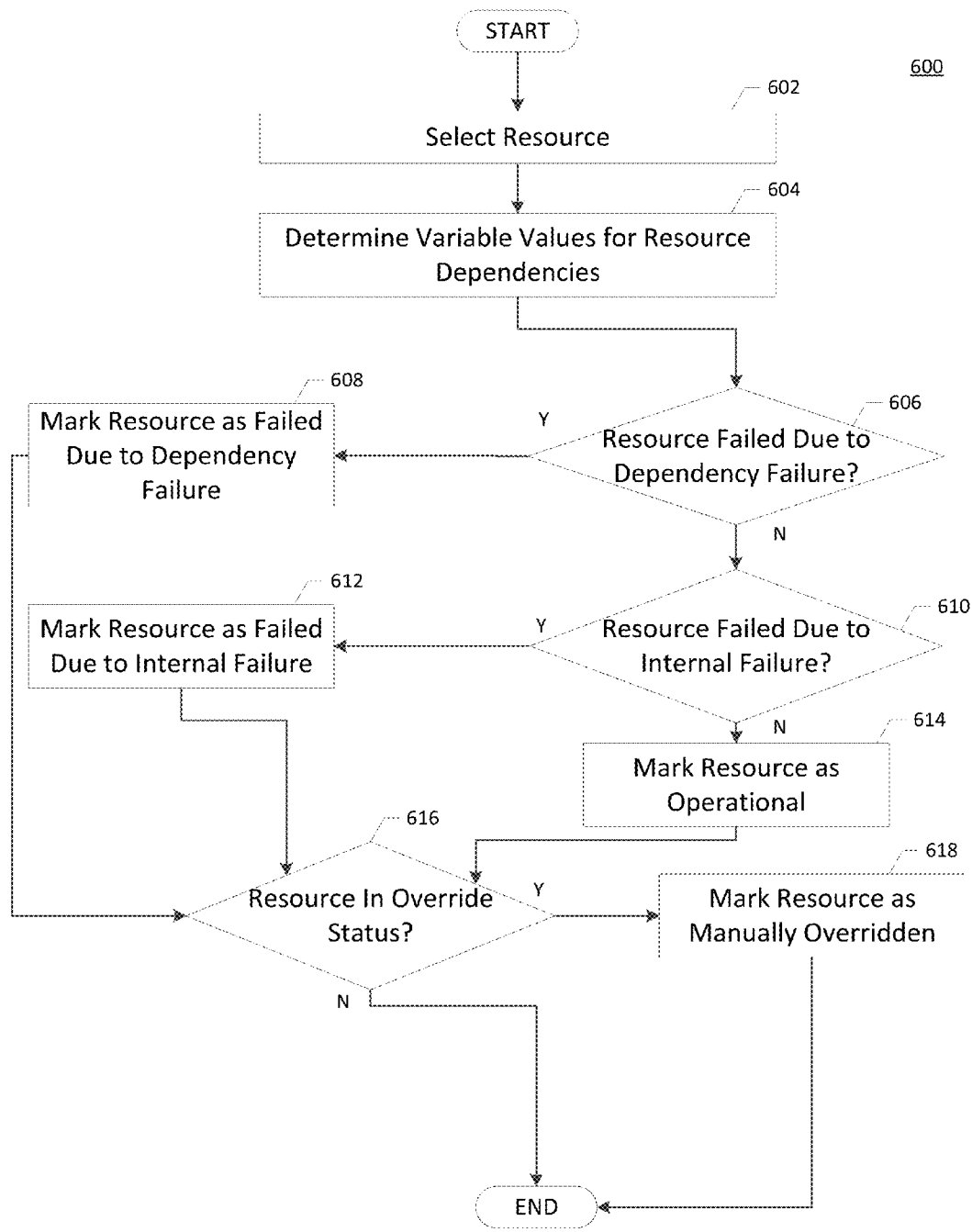
Figure 7:
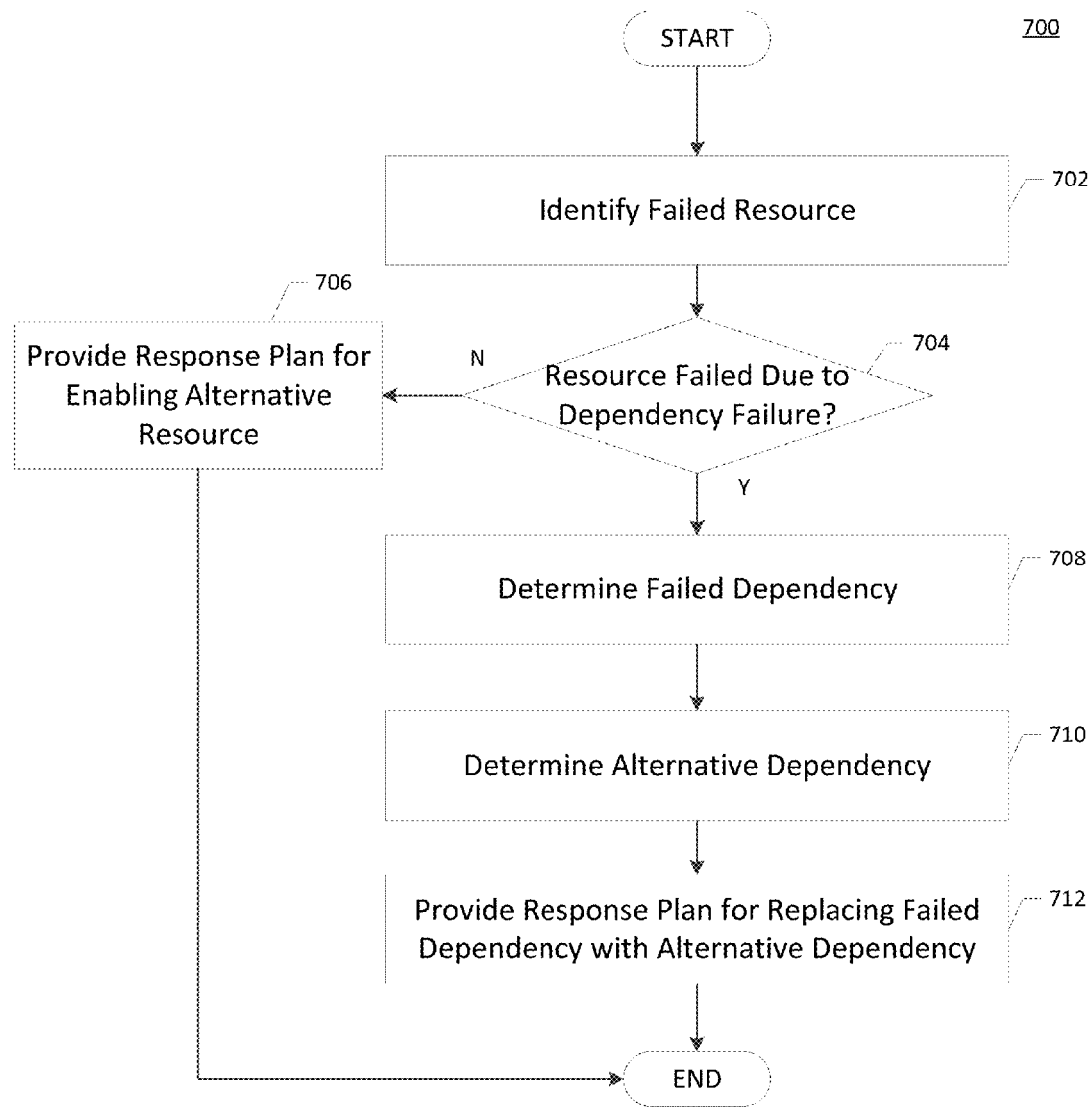
Figure 8:
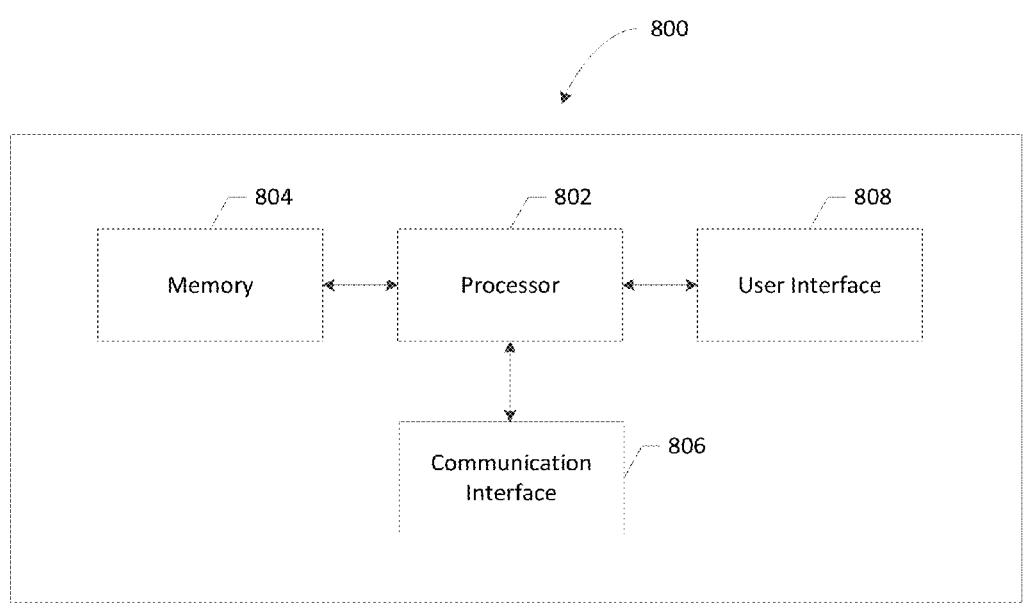

FIGS. 4-7 provide flowcharts of some exemplary processes for generating, modifying, accessing, and/or interacting with an event response plan in accordance with some embodiments of the present invention; and FIG. 8 illustrates a block diagram of components that may be included in devices for resource dependency planning in accordance with some embodiments of the present invention.

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

DETAILED DESCRIPTION

Overview

Existing systems for resource dependency planning provide facility operators with static representations of facility resources. These static representations may include facility blueprints and schematics that illustrate the connections between components and where dependencies and redundancies exist, without any context or simulation capability. As part of planning operations to prepare for abnormal events, these static representations may be used to assist with probabilistic risk assessment (PRA), a technique that attempts to model the chance of failure of each resource, and the impact that failure of that resource will have on the overall functionality of a larger system or even an entire facility. While these techniques may provide operators with useful data as to what problems may occur and how likely they are to occur, these techniques do not readily provide operators with useful data as to why particular failures occur, or proper remedial measures to address these problems. In many cases, these PRA techniques also fail to assess the impact of the failure of particular systems or functionalities on the larger system or the likelihood of systematic failures that are likely to occur simultaneously (e.g., a tsunami coincident with a seismic event, as occurred at the Fukushima Daiichi Nuclear Power Plant). Existing techniques fail to provide applications, interfaces, and tools that allow operators to simulate, model, and monitor the effects of failures of particular resources and remedial measures to address those failures in order to provide comprehensive response plans to preemptively plan for abnormal events. Furthermore, it would be advantageous to provide a dynamic resource dependency planning system to assist operators with an efficient reference to the status of resources and remedial measures when an abnormal event occurs.

Example embodiments may provide operators with a comprehensive application for modeling resource dependencies. For example, a particular facility (e.g., a nuclear power plant), may include multiple interdependent systems such as an internal electrical grid, a cooling subsystem, a ventilation and exhaust system, a system of backup generators, and the like. A failure of one or more of these systems, or certain components of these systems, may cause a series of failures in any resources that depend upon those failed systems. For example, a failed exhaust fan may cause a failure in a generator that depends upon the failed exhaust fan for ventilation. The failure of the generator may cause a failure in any coolant pumps that solely depend upon the failed generator. The failure of the coolant pump may cause a failure in any components that are reliant on continual cooling, such as a reactor core. In order to ensure the ability to remain operational in the face of such an equipment failure, facilities of a certain complexity generally include multiple redundancies for mission-critical resources. Embodiments may advantageously provide a system for monitoring and these redundancies to ensure continued operation and, in some embodiments, remedial plans for addressing equipment failures and responding to abnormal events. For example, upon failure of the above-mentioned exhaust fan, embodiments may indicate to an operator the failure of the other components that depend upon the fan, taking into account any redundant resources that might enable equipment dependent upon the failed fan to continue operating. Such an interface could be employed to identify and plan for risks associated with abnormal events, such as by enabling operators to assess the impact of a particular resource failure or series of resource failures and to develop remedial measures. In some embodiments, the interface itself may generate remedial measures based on the dependencies and identification of the failed resource and logic for remediating the failure.

Embodiments may provide operators with displays, devices, and other interfaces that are configured to assist operators with planning resource dependencies, assessing the risk associated with certain resource failures and abnormal events, monitoring of resource statuses, and dynamically preparing response plans for equipment failures based on the resource dependencies. For example, embodiments may include a mobile device capable of wirelessly receiving resource status information and updating a remediation plan based on the resource status information and a set of logic associated with the resource and/or the facility. Embodiments may include a touch screen interface allowing users to easily and efficiently interact with an interface to facilitate these operations.

For the purpose of this application, the term "resource" should be understood to refer to equipment, components, devices, systems, functionalities, and the like. For example, the term resource should be understood to include components of a particular equipment, systems enabled by one or more pieces of equipment, functionality enabled by one or more systems, and the like. It should be readily appreciated that the use of the term resource does not imply a strict hierarchy among resource types, even though dependencies among particular resources may be clearly defined. For example, a particular piece of equipment may enable a functionality, and a functionality may enable another component or piece of equipment. Various specific, non-limiting examples of dependency relationships among resources are described further below with respect to FIGS. 1-3.

The terms "event response plan" or "abnormal event response plan" should be understood to refer to a set of protocols and/or instructions for responding to an abnormal event. Although some embodiments are presented herein with respect to the specific example of an emergency planning interface, it should be readily appreciated that the same or similar techniques could be applied to any abnormal event, including events that require response planning but which are not emergencies. For example, in addition to preparing event response plans for emergency conditions such as seismic events, tsunamis, fires, chemical spills, security events, and the like, embodiments may also be employed to develop and enact event response plans to non-emergent, but unexpected, abnormal, or unusual events. For example, while a disruption to a power grid due to damage to transmission lines or a sudden usage spike may not qualify as an emergency, embodiments may still function to assist with development of a response plan to mitigate negative impacts and remediate any damage or disruption caused by the event.

These event response plans may include one or more maps and checklists for informing a user of one or more protocols and/or instructions. In some embodiments, the event response plan may include a set of logic for determining elements of the one or more protocols and/or instructions. The event response plan may also include maps, facility equipment diagrams, and the like, for use by responders. The event response plan may include "pre-plans" derived in advance and "attack plans" that are developed for addressing specific conditions as they occur. Example embodiments of using a resource dependency planning operations to assist with generation of an event response plan, an interface for viewing resource dependencies in the context of an event response plan, and a device for providing the resource dependency plan in the context of an event response plan are described further below with respect to FIGS. 1-8.

The term "resource status" should be understood to refer to information about the current status of one or more resources, such as data received from one or more facility sensors, resource sensors, via user input to a resource dependency planning interface, and/or any other data relevant to the current status of the resources as related to a resource dependency planning interface.

Embodiments of the present invention are illustrated in the appended figures and description below in relation to resources associated with a nuclear power plant. However, as will be apparent to one of ordinary skill in the art in view of this disclosure, the inventive concepts herein described are not limited to nuclear power plants. Indeed, the concepts described herein may be applied to various facilities with resources and in response to various types of abnormal events. Example alternative facilities include, but are not limited to, industrial facilities such as ports, refineries, offshore oil rigs, factories, chemical processing plants and non-nuclear power plants, residential facilities such as apartment buildings, or neighborhoods, or any other structures that may benefit from development of an resource dependency plan or event response plan, such as stadiums, movie theaters, schools, or concert halls. In some example embodiments, event response plans may also take the form of evacuation routes, incident response planning for a geographical area and/or the like. Example abnormal events may include emergency conditions including, without limitation, other emergencies such as seismic events, tsunamis, terrorist attacks, hurricanes, tornados, and the like.

Example Resource Dependency Structure

Figure 1:
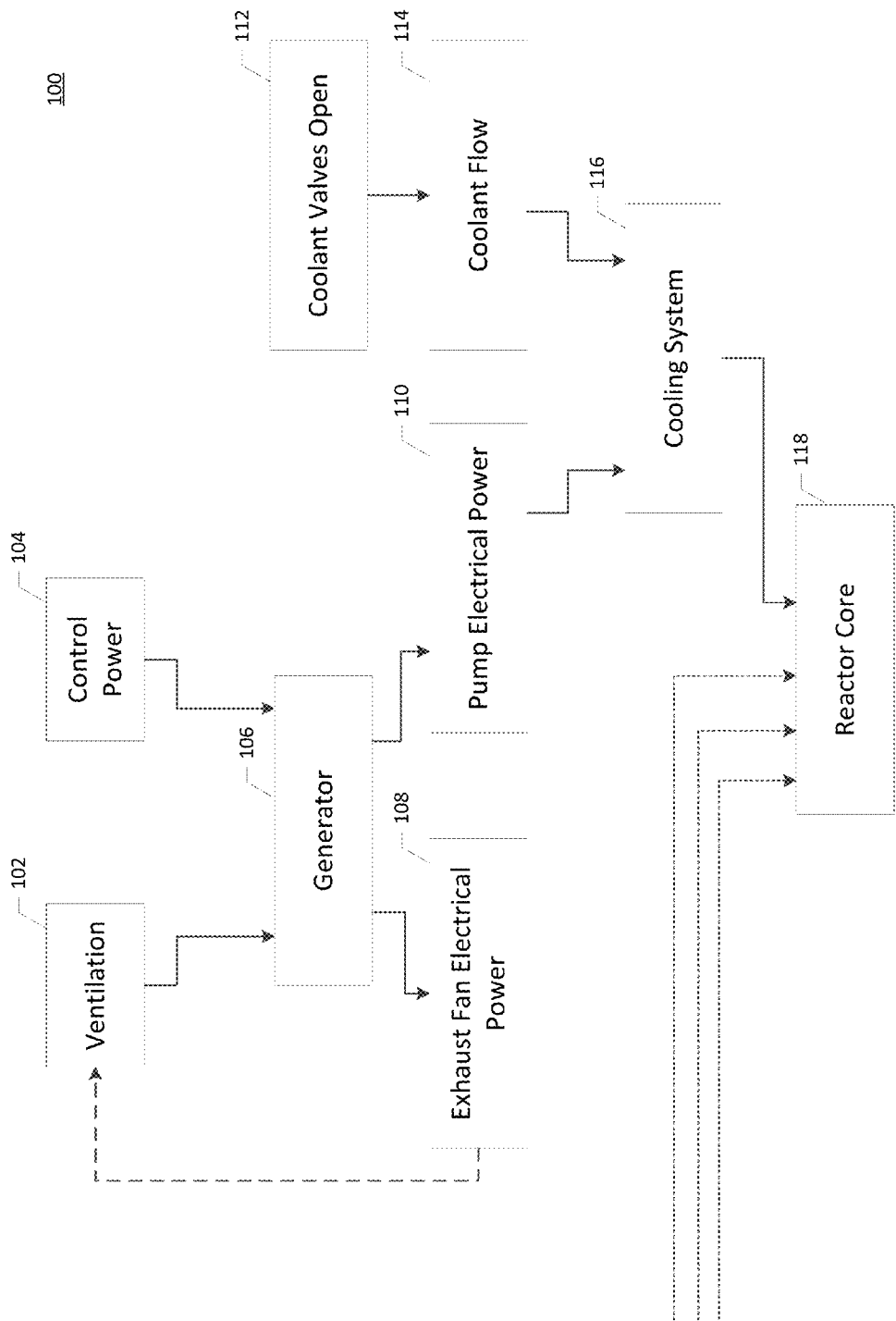
FIG. 1 illustrates an exemplary resource dependency structure in accordance with some embodiments of the present invention.

FIG. 1 illustrates an example resource dependency structure 100 in accordance with some embodiments of the present invention. As described above, resources may be dependent upon other resources to function. The structure 100 is one way of visualizing these resource relationships. Example embodiments may utilize such a structure to assist operators with determining the impact of changes in resource status on other resources within the system. Some embodiments may include a processing logic that maps the status of resources to dependencies associated with the resources to assess the impact of these changes. It should be readily appreciated that the example resource dependency structure 100 is simplified to provide a clear example, and that resource dependency structures may include varying numbers of different resources, independent and redundant dependencies, links between equipment, components, functionalities, and systems, and the like.

The example resource dependency structure 100 includes several different resources, including particular components, equipment, functionality, and systems. For example, the structure 100 illustrates an interaction and dependency for a generator 106, such as a gasoline or diesel generator used to provide emergency power or initial power to kick start a power generation process. In order to function, the generator 106 requires proper ventilation 102 and control power 104 (e.g., to power the control electronics that send a signal to activate the generator). If these dependencies are not present, then the generator 106 may be non-functional or performance may be degraded. The generator 106, in turn, may provide electrical power to a set of exhaust fans 108 and a coolant pump 110. In some embodiments, the exhaust fan power 108 in turn enables a ventilation system to function, provide the ventilation 102 for the generator 106. Such a dependency is an example of a possible "circular dependency" in which functionality of a first resource is enabled by second resource, and functionality of the second resource is enabled by the first resource. In many cases, such circular dependencies relate to dependencies based on redundant resources (e.g., as long as any one set of exhaust fans is functional, the ventilation system may be enabled, even if the exhaust fans are receiving power from another generator (not pictured)). However, embodiments may be configured to handle such circular dependencies through the use of particular resource circular dependency logic described in further detail herein.

The generator 106 may further provide power to a pump system 110. Electrical power to the pump system 110 may act as a dependency for a cooling system 116, which may in turn also depend upon a flow of coolant 114. The coolant flow 114 may depend upon a certain valve or series of valves 112 being opened in the proper configuration.

A reactor core 118 may depend upon, among other things, active cooling as provided by the cooling system 116. As such, assuming a configuration without redundant resources, a failure in the generator 106 may lead to a failure of pump electrical power 110, which in turn causes a failure in the cooling system 116. Failure of the cooling system 116 may cause a failure in the reactor core 118. It should be readily appreciated that the modeling and anticipation of the impact of such failures is an important part of the facility design process in order to provide proper contingency plans for resource failures.

Example Resource Dependency Planning Interfaces

Figure 2:
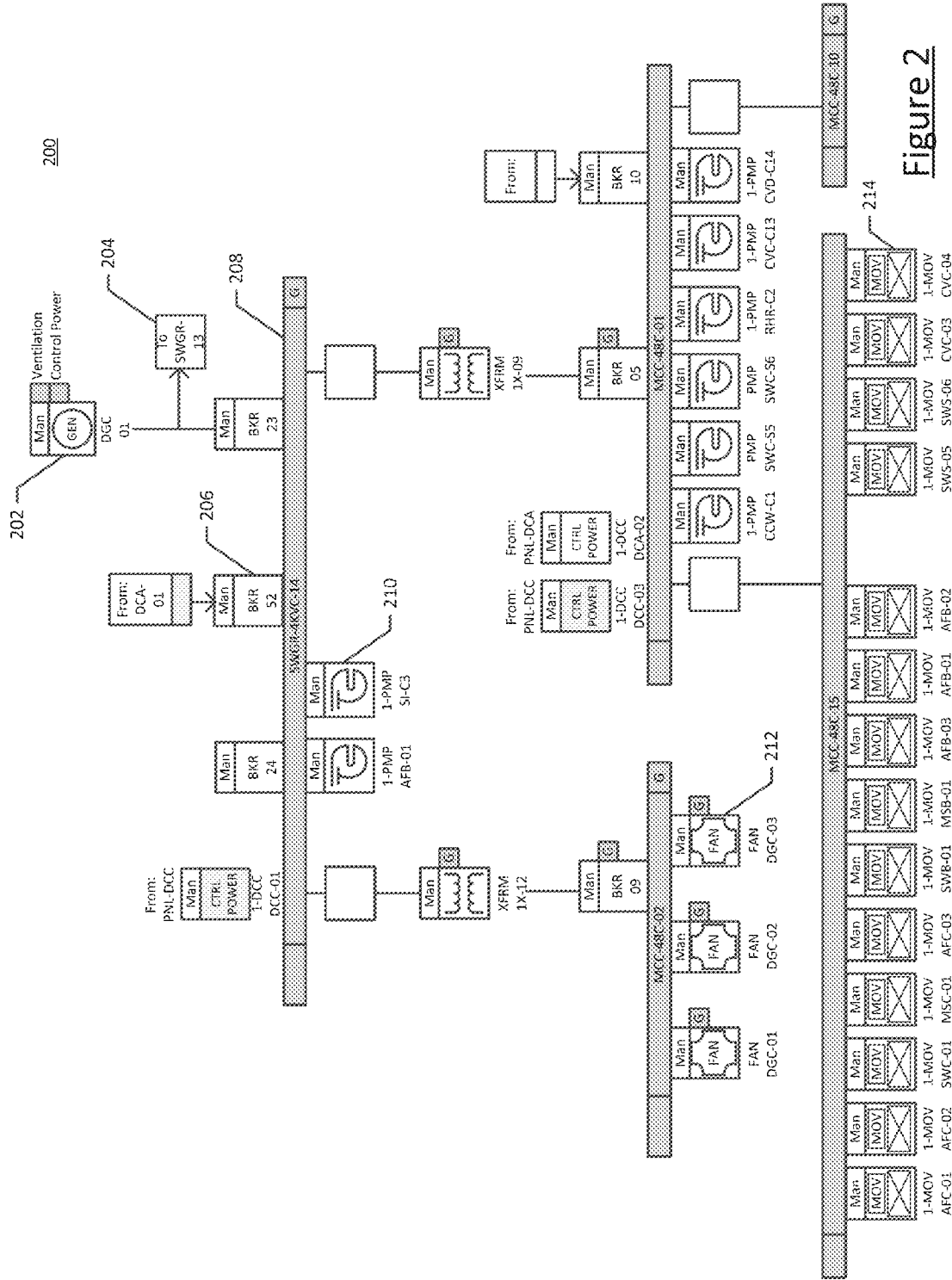
FIG. 2 illustrates an exemplary interface for accessing a detailed view of dependencies of an exemplary electrical grid in accordance with some embodiments of the present invention.

FIG. 2 illustrates an exemplary interface 200 for interacting with a resource dependency planning system in accordance with some embodiments of the present invention. The interface 200 provides an interactive display of dependencies between resources for a facility. The interface 200 may be used for simulation and planning purposes, such as to assess the impact of a failure of a particular resource on the operational status of the facility. For example, an operator may mark a particular resource or resources as failed in order to assess the impact of the failures on other resources. The interface 200 may alternatively or additionally be used to obtain real-time status information of resources (e.g., based on one or more sensors attached to the resource, an alert monitoring system or the like) within the facility and to develop remedial measures for responding to resource failures. In some embodiments, the interface 200 may obtain dynamic resource status in real-time and the interface 200 may be updated to reflect the dynamic resource status.

The interface 200 displays an image corresponding to a resource dependency plan of a power generation facility that includes a nuclear power plant. The instant interface 200 depicts the relationship between resources that are dependent upon an electrical grid. For example, the interface 200 illustrates the interaction between in or more generators 202, breakers 206, switches 208, coolant pumps 210, intake/exhaust fans 212, and valves 214. It should be readily appreciated than the interface 200 may depict only a portion of the resources associated with the particular facility at a given time, and dependencies for resources not visible in a single screen interface may be presented as external links 204. The interface 200 may include a variety of icons and status indicators for the depicted resources. For example, the generator 202 may include separate status indicators for whether the generator is receiving ventilation and control power.

The interface 200 may dynamically update as the status of the resources changes. For example, resources may be color coded based on their status. Example status colors may include green for "operational" or "functional," red for "internal failure" (e.g., the resource itself has experienced a failure), orange for "dependency failure" (e.g., the resource is failed or degraded due to a failure of one or more of the resource's dependencies), and blue for "manual override" (e.g., where a resource is indicated to be manually enabled or operational). In some embodiments, the status of the resources may be received dynamically from one or more sensors (e.g., as a result of diagnostic data provided by the resource or resource monitoring tools), or manually by an operator (e.g., by selecting a particular resource and inputting the status of the resource using the interface 200). The interface 200 may allow operator interaction in a variety of manners, including via a keyboard, mouse, touchscreen, or the like. The operator may select a particular resource to update the status of the resource, and the status of the other resources that depend upon the selected resource may dynamically update in accordance with the status change to the selected resource.

Changes to the status of the displayed resources may be performed in accordance with a set of resource dependency logic. The resource dependency logic may specify the underlying dependency relationships between the resources, and direct changes to the status of the resources according to those dependency relationships. Embodiments may further include an additional interface allowing an operator to add, edit, modify, delete, or otherwise alter the resource dependency logic to provide a flexible framework for viewing resource dependencies. For example, an operator may wish to reroute power from an emergency generator to another resource that has a power failure. Upon modification of the resource dependency logic for the failed resource to depend upon the emergency generator, the interface 200 may provide an accurate display of the impact of the rerouted generator on the set of resources as a whole. As such, example embodiments may provide operators with the ability to dynamically assess the impact of remedial measures during a response to an abnormal event.

Figure 3:
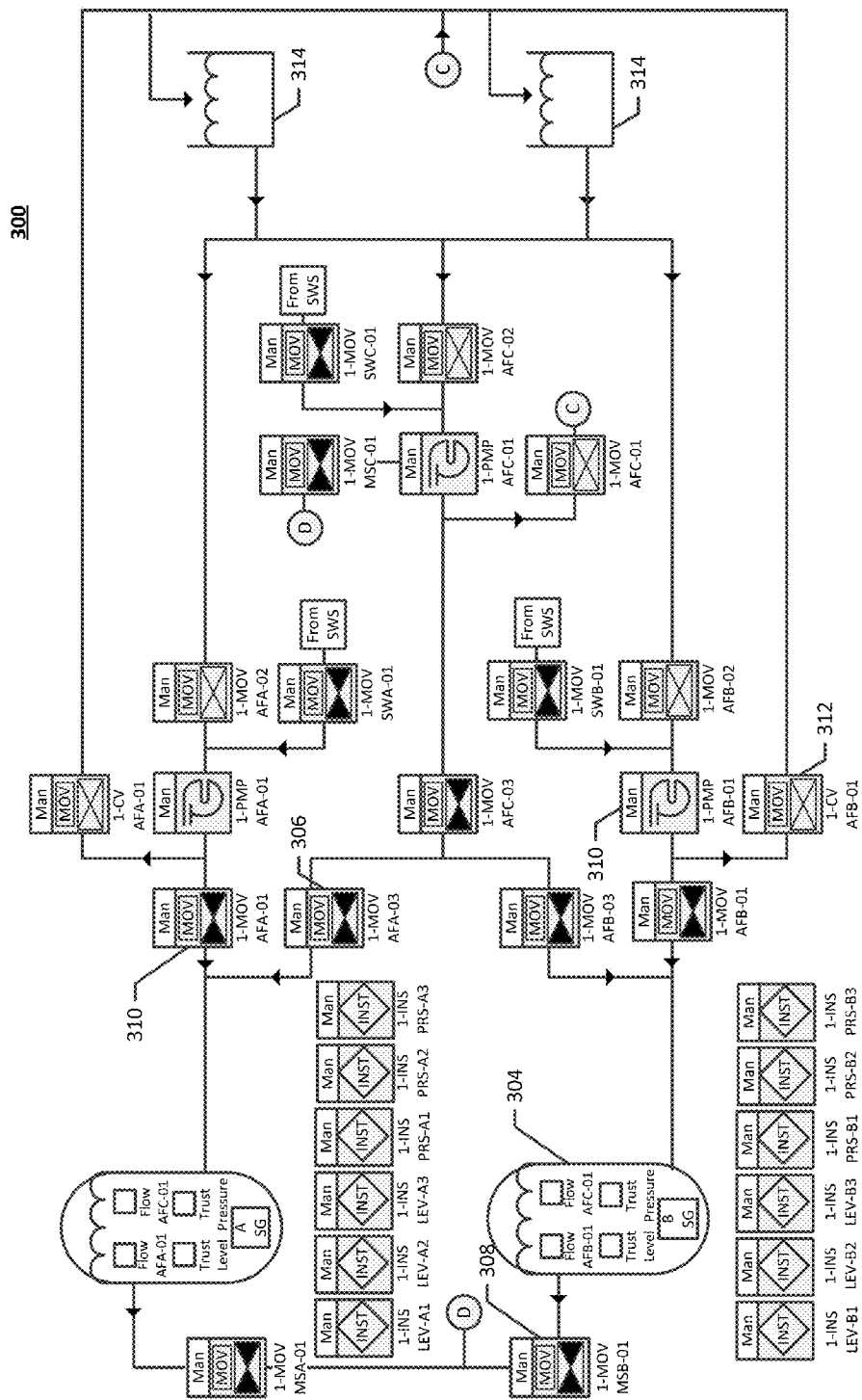
FIG. 3 illustrates an exemplary interface for accessing a detailed view of dependencies of an exemplary cooling system in accordance with some embodiments of the present invention.

FIG. 3 illustrates an exemplary interface 300 for accessing a detailed view of dependencies of an exemplary cooling system in accordance with some embodiments of the present invention. As with the interface 200 described above, the interface 300 includes a series of icons and connections representing the relationships between elements of an exemplary system, in this case, a cooling system. The icons include representations of steam generators 302, 304, valves 306, 308, 310, 312, reservoirs 314, and pumps 316.

In the present example, the steam generators 302, 304 are each dependent upon receiving flow via one or more of the valves. Each of the valves is in turn dependent upon receiving flow from the reservoirs via the upstream valves. For example, the interface indicates that the steam generator 302 is dependent upon flow from at least one of the valves marked AFA-01 or AFC-01. Since, in the present example, the valve 306 is failed, flow is not being received from the AFC-01 valve and thus the steam generator 302 icon is updated to indicate that flow is not being received from the AFC-01 channel by virtue of a failed dependency (e.g., the appropriate portion of the steam generator 302 display may be marked in an orange color to indicate a failure due to a dependency failure).

The interface 300 may further indicate the status of resources based on functional dependencies in addition to or alternatively to dependencies on particular equipment. For example, the steam generator 302 may depend on a resource that indicates whether coolant flow is being provided, rather than the specific status of any one valve or reservoir.

The interface 300 may also provide the operator with the ability to indicate a manual override of a particular resource. For example, the valve 310 in the present example has been marked as manually overridden based on selection of a "Man." interface control associated with the valve 310. The manual override state may be indicative of a user notifying the system that the equipment is functional despite the detected resource status (e.g., in the case of faulty diagnostics) or the status of the equipment's dependencies (e.g., in the case where a dependency has been restored from another source not indicated in the default logic, such as tying in power from an alternative backup generator). The manual override state may also be used to indicate manual intervention, such as an operator manually opening a closed valve.

Although the instant examples have been given with respect to particular components of a power generation facility, it should be readily appreciated that the same or similar techniques could be applied to various additional use cases. Embodiments may be employed to assist with response to abnormal events, such as emergency conditions. For example, embodiments may be utilized to plan evacuation routes or select hospitals for treating casualties based on the status and capacity of roads or other travel routes, the location of the abnormal event, the number of casualties, and the like. As the status of particular resources changes (e.g., the number of travelers on the particular route as compared to the capacity of the route), the interface may update a response plan to reflect the changing status and capacity of the resources.

The interfaces 200, 300 may further provide for the ability to obtain additional information about particular resources. The operator may perform a selection operation on a particular resource and be provided with a breakdown of the current status of the resource. For example, upon selection of a failed resource, the operator may be provided with a detailed breakdown of why the resource has failed (e.g., which dependencies resulted in a failure of the resource) and what remedial measures may be taken to address the failure. For example, in the event of a failure of a power source, the interface may suggest tying in power from a functional backup generator to restore power.

In some example embodiments, changes in resource status may trigger event logging and/or the initialization of timers. For example, equipment failures, remedial measures, and manual overrides may be logged by the interface. The interface may also provide one or more timers for tracking the resource statuses. For example, upon detection of a resource failure, the interface may initialize a timer indicating how long the particular resource has been offline. The interface 200, 300 may include a legend or sidebar for tracking each of the timers. In some embodiments, this legend interface may be used to provide the user with the status of any initialized timers even if the user navigates away from the screen upon which the icon is placed. It should be appreciated that alternative timers may also be employed other than timers based on the detection of emergency conditions. For example, timers may be used to monitor the amount of time a particular brigade of response personnel have been in a structure, the remaining time backup generators will remain operational, or for any other event for which response personnel may wish to monitor an elapsed or remaining time.

Similarly, changes in the situational status of particular locations or resources (e.g., resource failed, resource recovered, or resource dependency failed) may also be logged. Logging operations may also occur at periodic intervals to take a snapshot of the situational response status. In some embodiments, the interface 200, 300 may also provide log viewing and playback functionality, allowing a user to review the response to a particular incident using the tools and status monitoring windows provided by the interface 200, 300.

Example Resource Dependency Planning

FIGS. 4-7 provide flowcharts of some exemplary processes for generating, modifying, and/or interacting with a resource dependency plan in accordance with some embodiments of the present invention. These figures illustrate examples of different operations that may be employed to generate, modify, and retrieve resource dependency plans for a particular facility or structure.

Figure 4:
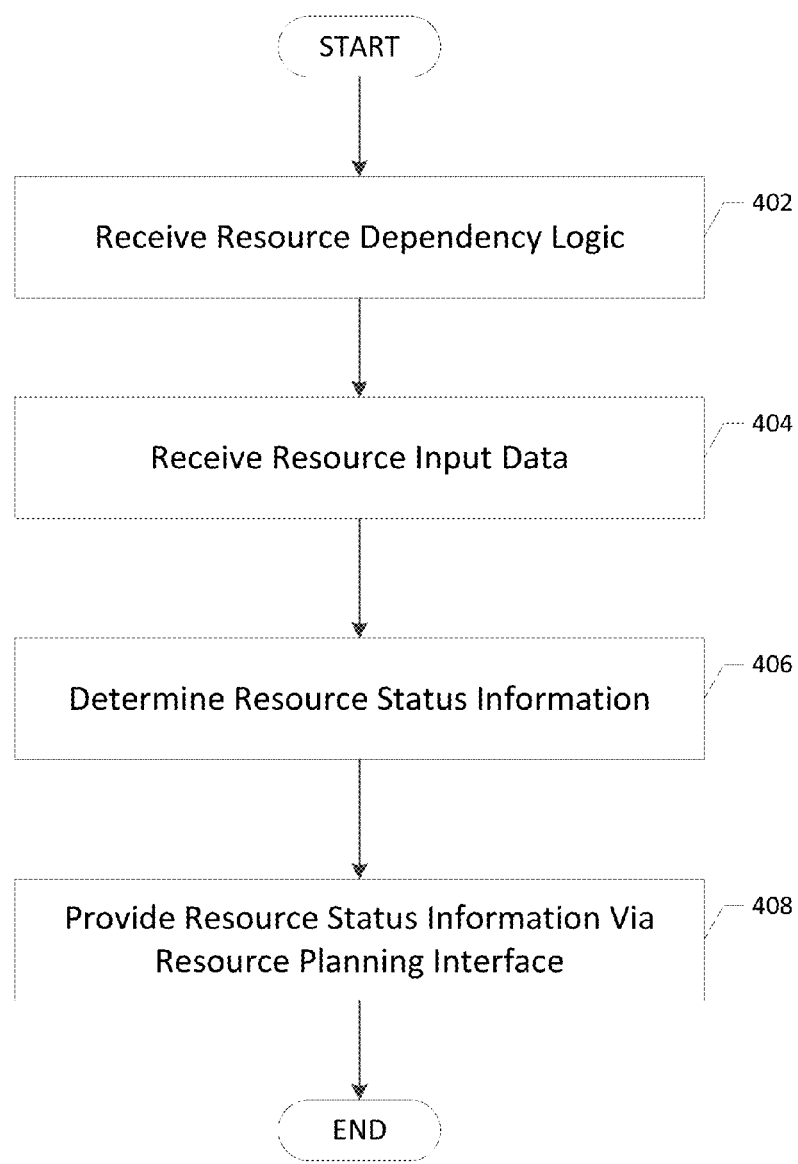

FIG. 4 illustrates a flowchart of an exemplary process 400 for resource dependency planning in accordance with embodiments of the present invention. The process 400 may be employed to provide a user with a dynamic interface for planning, simulating, and monitoring resource dependencies for a particular facility. The process 500 may be employed, for example, by an interface, such as the interface 200, 300 described with respect to FIGS. 2 and 3, or by a device providing such an interface.

At action 402, resource dependency logic is received. In the present context, the term "resource dependency logic" may include, but is not limited to, facility maps, schematics, blueprints, equipment diagrams, and the like that include information for dependencies among resources or which may be processed to derive resource dependencies. In some embodiments, the resource dependency logic may include one or more data tables that include resource dependency information. For example, each resource may be represented by a row of the data table with references to rows of the data table for other resources upon which the resource depends. In some embodiments, certain columns of the table may be used to represent resources upon which the particular resource has redundant dependencies (e.g., if any one of these resources is available, the dependency is satisfied) or independent dependencies (e.g., only if all of these resource are available is the dependency satisfied). Embodiments may provide an interface allowing an operator to add, edit, modify, or delete these dependencies. Changes to these dependencies may automatically propagate through the system, providing a flexible, dynamic framework for modeling resource dependencies. For example, in particular embodiments, the resource dependency logic may be included as a series of formulae in a spreadsheet interface, and changes to the equipment dependencies may be reflected by changes to the formulae. As another example, resource dependency logic may include one or more files or data structures provided to a resource dependency planning interface (e.g., opening or loading a file or files associated with a particular facility or set of resources). As yet another example, the resource dependency logic may be derived from a set of requirements or specification files (e.g., Unified Modeling Language (UML) files or documents).

At action 404, resource input data may be received. The resource input data may include information about the status of one or more of the resources of the facility. For example, the resource input data may include information received from sensors coupled to the resources (e.g., internal diagnostics), sensors at locations proximate to the resources (e.g., smoke and heat detectors in the same room as the resource), manual operator input (e.g., an operator selecting a resource and marking it as "failed"), or various other automatic and manual methods of acquiring data about the status of one or more of the resources.

At action 406, the resource input data is used in conjunction with the resource dependency logic to determine the status of one or more of the resources. For example, the resource input data may identify which particular resources have failed, and the process 400 may determine which resources depend upon those failed resources, and mark those resources as failed as well. A particular example of a method for determining the status of resources based on the resource input data and the resource dependency logic is described further below with respect to FIG. 6.

At action 408, the resource status information is provided via a resource planning interface, such as the interfaces 200, 300 described above. In some embodiments, the resource status information is provided to operators via an abnormal event planning interface, such as an interface as described in U.S. patent application Ser. No. 13/896,016, filed May 16, 2013, which is herein incorporated by reference in its entirety.

The resource status information may include determination of one or more remedial measures for addressing resource failures. For example, the resource status information may be analyzed to identify the source of failures (e.g., which particular dependencies have failed), and the interface may automatically suggest remedial measures to restore the failed dependencies. An example process for determining a remedial measure to restore a failed dependency is described further below with respect to FIG. 7.

Figure 5:
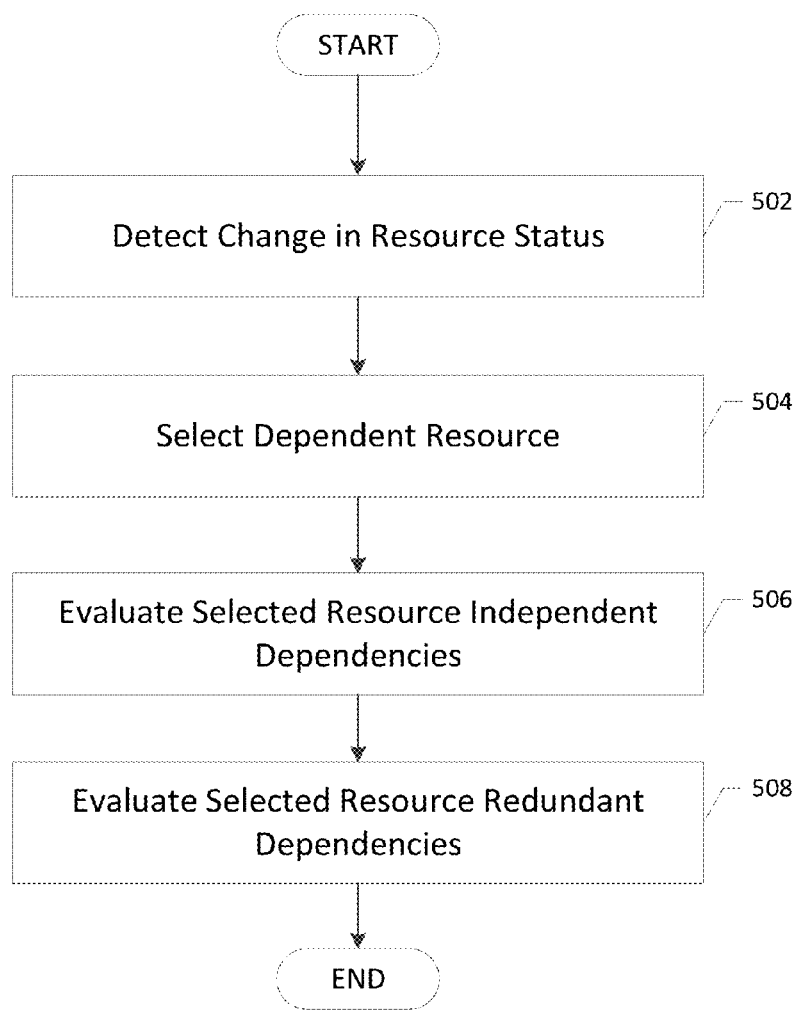

FIG. 5 illustrates a flowchart of an exemplary process 500 for updating a resource status using resource dependency logic in accordance with embodiments of the present invention. The process 500 provides for the updating of the status of resources depicted in an resource planning interface in response to changes in the status of other facility resources. For example, restoration of an operational status to one or more resources may also have the effect of restoring an operation status to resources that depend upon the restored resources. The process 500 may be employed by an interface, such as the interfaces 200, 300 described above with respect to FIGS. 2 and 3, or by a device providing such an interface.

At action 502, a change is detected in a resource status. For example, one or more sensors may indicate that the status of a resource has changed, or an operator may manually select an updated status for a particular resource. For example, the operator may select a particular resource and choose an interface option to mark the resource as operational, failed, or manually overridden.

At action 504, one or more of the resources dependent upon the changed resource is selected. It should be appreciated that while the instant example relates to determining a status of a particular selected resource, embodiments do not necessarily need to select resources in a "one at a time" manner. Although the instant example describes selecting a particular dependent resource, multiple resources may be selected for simultaneous evaluation, and a change in a particular resource status may not necessarily imply that only resources dependent upon the particular changed resource are evaluated for updating. For example, a periodic evaluation may occur for all resources at a particular time interval, such that resource dependency updates are performed at the particular interval rather than in response to the particular change in resource status.

At action 506, the status of independent dependencies (e.g., a dependency that does not have any redundancies) of the selected resource are evaluated. For example, if a selected resource is dependent upon resources A and B, such that both resource A and resource B must be present to ensure the operation of the selected resource, then resources A and B may be considered independent dependencies. The processing at action 506 may include determining whether all of the independent dependencies are present.

In some embodiments, the status of particular resources may be represented as a numerical value. For example, resource statuses may be defined such that a status of "2" indicates a resource failure due to an internal failure, a status of "1" indicates a resource failure due to a dependency failure, a status of "0" indicates that the resource is functional, and a status of "−1" indicates that the resource is functional due to a manual override state. Where the resource status is represented as such values, the status of the independent dependencies may be evaluated by performing a "max( )" or "OR" operation on the values of the status values of the resources identified as independent dependencies. The "max( )" or "OR" operation would thus identify whether any of the independent dependencies are in a failure state (e.g., a value of "1" or "2"). In the event of the max operation returning such a value which is greater than 0, the selected resource may be identified as in a failure state due to the failure of an independent dependency.

At action 508, the resource status of redundant dependencies may be evaluated for the selected resource. The term redundant dependencies may refer to resources upon which the selected resource depends, but of which a single operational resource is sufficient to satisfy the operational conditions for the selected resource. For example, if the selected resource requires electrical power to function and is coupled to two separate emergency generators, then if either of the emergency generators is active and supplying power that would be sufficient to ensure operation of the selected resource. Evaluation of redundant dependencies may occur in a similar manner to evaluation of independent dependencies, with numerical values representing the resource statuses. However, rather than performing a "max( )" or logical "OR" operation of the values, the process 500 may instead perform a "min( )" or logical "AND" operation on each set of values which are redundant with one another. For example, a set of logic for determining a status of a diesel generator that depends upon receiving control power and ventilation, with ventilation provided by at least one of two fans, might be represented as follows:

$$\text{Generator\_status} = \max(\text{control\_power\_status}, \min(\text{fan\_1\_status}, \text{fan\_2\_status})) \quad (Eq\ 1)$$

Where Generator_status is a numerical value for the status of the generator, control_power_status is a numerical value for the status of the control power system, and fan_1_status and fan_2_status are numerical values for the statuses of the two fans, respectively. It should be readily appreciated that the processes described with respect to actions 506 and 508 may be performed as a single evaluation. For example, the process 500 may identify a minimum value for each set of redundant dependencies, and take the maximum value for each particular resource evaluation that may result in a failure of the equipment (e.g., evaluating each independent dependency separately and each group of redundant dependencies as a single independent dependency). The result of this evaluation may be assigned as the resource status of the selected resource, such that if all of the necessary dependencies have a "0" or "good" status, the selected resource is marked as good. The evaluation may include additional logic to mark the resource as "dependency failed" or "1" rather than an internal failure, since a failure as a result of this evaluation would indicate the resource is failed due to a failure of one or more of its dependencies. For example, if the result of the evaluation is greater than 1, the value may be set to 1. In this manner, embodiments may identify not only a failure of a particular resource, but also derive information as to the cause of the failure. As such, operators are not only notified of the failure, but also provided with information they may use to remediate the failure. The evaluation may also include a determination as to whether the resource is in a manual override status, and the process 500 may be configured to allow a manual override status to supersede the value of the evaluation.

FIG. 6 illustrates a flowchart for an exemplary process 600 for displaying a resource status via a resource dependency interface in accordance with some embodiments of the present invention. As described above with respect to FIGS. 2 and 3, embodiments may provide an interface for displaying the status of one or more resources based on the dependencies of the resource. The process 600 may be employed to receive resource status information and to associate particular resources with a status based on the status of the resources upon which they depend. The process 500 may be employed by an interface, such as the interfaces 200, 300 described above with respect to FIGS. 2 and 3, or by a device providing such an interface.

At action 602, a resource is selected. As described above with respect to FIG. 5, resources may be evaluated serially or in parallel, and in response to a status change or at a periodic time interval. It should be readily appreciated that different methods of selecting resources for evaluation may be employed in various embodiments.

At action 604, values may be determined for variables associated with the resource. For example, an evaluation may be performed for the resource as described above with respect to FIG. 5, whereby a formula is applied to variable values for resources upon which the selected resource depends.

At action 606, the process branches depending upon whether the resource is determined to be failed based on a failure of one or more of the resource's dependencies. If the resource is failed due to a dependency failure, the process 500 proceeds to action 608 where the resource is marked as failed based on a dependency failure. For example, an interface may identify the resource as failed due to a dependency failure by highlighting an icon associated with the resource in an orange color, causing an icon for the resource to blink, generating a pop-up warning, generating a sound, or the like. After marking the resource as failed due to a dependency failure, the process 500 may proceed to action 616 to determine if the resource is in a manual override state.

At action 610, the process branches depending upon whether the resource is determined to be failed based on an internal resource failure. For example, if the dependencies required by the resource are all in an operational state as indicated by the attendant status values, but the resource is still identified as failed, such as due to internal diagnostics or a failure to report a status, then the process may determine that the resource has suffered an internal failure. If the resource has suffered an internal failure, then the process proceeds to action 612 where the resource is marked as failed due to an internal failure. For example, an interface may identify the resource as failed due to an internal failure by highlighting an icon associated with the resource in a red color, causing an icon for the resource to flash, generating a pop-up menu, generating a sound, or the like. After marking the resource as failed due to an internal failure, the process 500 may proceed to action 616 to determine if the resource is in a manual override state.

At action 614, the resource is marked as operational if it is determined that the resource is not failed due to an internal failure or a dependency failure. Marking the resource as operational may entail highlighting a display icon in green or other audio or visual cues, similarly to the acts of marking the resource as failed described with respect to actions 610 and 606, though it should be appreciated that each status may be associated with different audio or visual cues.

At action 616, the resource is evaluated for a manual override condition. As described above with respect to FIGS. 3-5, the resource may be indicated as in a manual override state due to user intervention either using the interface (e.g., selecting the resource as manually overridden) or via receiving data from one or more sensors (e.g., sensors coupled to a valve detecting that the valve has been manually opened or closed). The manual override state may supersede any statuses determined by evaluating the resource dependencies. If the manual override state is detected, the process 600 proceeds to action 618 to mark the resource as manually overridden. Otherwise, the process 600 may end or repeat with the resource marked as operational.

FIG. 7 illustrates a flowchart for a process for determining remedial measures based on resource statuses in accordance with embodiments of the present invention. As described above with respect to FIGS. 1-3, embodiments may be employed to assist operators with responding to resource failures, emergency conditions, and other abnormal events. As part of the development of these remedial measures, embodiments may determine which resources have failed along with how and why the resources have failed. This determination may be used to assist with generation of response plans for remediating failures and abnormal event conditions which address the cause of problems rather than the symptoms. The process 700 may be employed by an interface, such as the interfaces 200, 300 described above with respect to FIGS. 2 and 3, or by a device providing such an interface.

At action 702, a failed resource is identified. The failed resource may be identified by various processes as described above with respect to FIGS. 1-6. At action 704, a cause of the failure is determined. For example, as described above, a resource may have failed due to an internal failure, or a failure of one or more dependencies of the resource. In the event that the resource has suffered an internal failure, the process 700 proceeds to action 704. Otherwise, the process proceeds to action 706.

At action 704, if the resource has suffered an internal failure, a response plan may be generated that focuses on either fixing the failure of the resource or limiting the impact of the failure by identifying alternative resources that can be enabled or repurposed to fill the role of the failed resource. For example, if the failed resource is an emergency generator, the process may identify an alternative emergency generator that is still functional and which can be rerouted to provide power to equipment that is dependent upon the failed generator, or the process may identify a set of reset and/or repair procedures for bringing the failed generator back online. In some embodiments, additional data may be employed to determine the appropriate remedial measures, such as data received from one or more facility sensors. For example, if a facility sensor detects that the failed generator has failed due to being submerged due to a flood, the process may provide a remediation plan focused on replacing the failed generator rather than providing a reset procedure that is unlikely to restore functionality due to the flood.

At action 708, if the failure of the resource is due to a dependency failure, the process may determine which dependency has caused the failure. The act of determining which dependency caused the failure may include examining the failed dependency to determine whether the failed dependency failed due to one of its own dependencies, or if the failed dependency suffered an internal failure. The process may continue searching "upstream" until the failed dependency that caused the original failure is identified.

At action 710, an alternative dependency is determined to replace the failed dependency determined at action 706. In cases where an "upstream" dependency is identified as causing the failure, the process may evaluate the best procedures to remedy the failed dependency. For example, if the selected resource has failed due to a lack of electrical power from an emergency generator, and the emergency generator has failed due to a lack of adequate ventilation, then the process may determine whether it is more feasible to restore ventilation to the generator or to identify an alternate, working emergency generator to power the selected resource. In some embodiments, remedial measures may be determined according to a priority list, with the easiest or simplest procedures receiving the highest priority. It should be appreciated that various additional or alternative criteria could be used for selecting a remedial measure, such as selecting a procedure with the highest chance of success, selecting a procedure that is likely to have the least impact on other resources, or by selecting a procedure based on a weighted average of values assigned to these criteria.

At action 712, a response plan is provided for addressing the dependency failure by proposing an alternative dependency. As described above with respect to action 710, the appropriate remedial measure may be determined in a variety of manners, including but not limited to providing procedures for repairing the failed dependency, replacing the failed dependency, or some combination of the two (e.g., establishing temporary power from an alternative emergency generator while repairs are made to the primary emergency generator). The response plan may be provided via an interface as described above with respect to FIGS. 2 and 3, such as by a set of procedures or a checklist displayed upon selection of an interface control associated with the failed resource.

In some embodiments, a particular resource or resource icon may be highlighted to indicate that the resource should be enabled or manually overridden to remediate a failure. For example, an icon for a backup emergency generator may be highlighted in magenta to suggest to operators that the backup emergency generator should be brought online to restore power to a failed resource. Response plans may be dynamically updated based on data received by the interface. For example, a particular pump may be associated with several procedures, any one of which will isolate the pump. In the event a response plan calls for isolation of the pump, a particular set of procedures may be selected based on the dependencies of the pump and in view of other data provided to the interface (e.g., emergency condition data indicating a location of dangerous condition such as a fire, chemical spill, or flood). In some embodiments, resources may be highlighted as "vulnerable" based on data provided to the interface. The interface may also calculate the amount of time before resources are likely to suffer damage, such as by evaluating a proximity to an emergency condition, an elapsed time since detection of the emergency condition, and the like. Response procedures may be recommended based on the results of analysis of this data and in view of the dependency relationships between resources, such as by instructing response personnel to prioritize vulnerable resources that will cause mission critical systems to fail if the vulnerable resources are disabled.

FIG. 8 illustrates a block diagram of components that may be included in an apparatus 800 for resource dependency planning in accordance with some embodiments of the present invention. The apparatus 800 may comprise one or more processors, such as a processor 802, one or more memories, such as a memory 804, communication circuitry 806, and a user interface 808. The processor 802 can be, for example, a microprocessor that is configured to execute software instructions and/or other types of code portions for carrying out defined steps, some of which are discussed herein, such as the flowcharts described above with respect to FIGS. 4-7. The processor 802 may communicate internally using data bus, for example, which may be used to convey data, including program instructions, between the processor 802 and the memory 804.

The memory 804 may include one or more non-transitory storage media such as, for example, volatile and/or non-volatile memory that may be either fixed or removable. The memory 804 may be configured to store information, data, applications, instructions or the like for enabling the apparatus 800 to carry out various functions in accordance with example embodiments of the present invention. For example, the memory could be configured to buffer input data for processing by the processor 802. Additionally or alternatively, the memory could be configured to store instructions for execution by the processor 802. The memory 804 can be considered primary memory and be included in, for example, RAM or other forms of volatile storage which retain its contents only during operation, and/or the memory 804 may be included in non-volatile storage, such as ROM, EPROM, EEPROM, FLASH, or other types of storage that retain the memory contents independent of the power state of the apparatus 800. The memory 804 could also be included in a secondary storage device, such as external disk storage, that stores large amounts of data. In some embodiments, the disk storage may communicate with the processor 802 using an input/output component via a data bus or other routing component. The secondary memory may include a hard disk, compact disk, DVD, memory card, disk storage on a remote computing node (e.g., a networked storage node or a digital download server) or any other type of mass storage type known to those skilled in the art.

In some embodiments, the processor 802 may be configured to communicate with external communication networks and devices using the communications circuitry 806, and may use a variety of interfaces such as data communication oriented protocols, including X.25, ISDN, DSL, among others. The communications circuitry 806 may also incorporate a modem for interfacing and communicating with a standard telephone line, an Ethernet interface, cable system, and/or any other type of communications system. Additionally, the processor 802 may communicate via a wireless interface that is operatively connected to the communications circuitry 806 for communicating wirelessly with other devices, using for example, one of the IEEE 802.11 protocols, 802.15 protocol (including Bluetooth, ZigBee, and others), a cellular protocol (Advanced Mobile Phone Service or "AMPS"), Personal Communication Services (PCS), or a standard 3G wireless telecommunications protocol, such as CDMA2000 1xEV-DO, GPRS, W-CDMA, LTE, and/or any other protocol.

The apparatus 800 may include a user interface 9808 that may, in turn, be in communication with the processor 802 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., the memory 804, and/or the like). In some embodiments, the user interface 808 may be configured to provide an resource dependency planning as described above with respect to FIGS. 1-7.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method for resource dependency planning comprising:
   receiving resource dependency logic, the resource dependency logic defining a dependency relationship among a plurality of resources, the plurality of resources being a combination of one or more of equipment, components, devices, systems, functionalities, a component of a particular equipment, a system enabled by one or more pieces of equipment, or a functionality enabled by one or more systems,
   wherein each resource is configured to provide a dynamic resource status, in real-time, via at least one of one or more facility sensors or one or more attached sensors;
   receiving a set of resource input data, from at least one of the one or more facility sensors or the one or more attached sensors, in real-time, the resource input data indicating a failure of at least one of the plurality of resources;

determining, using a processor, an impact of the failure on at least one failed resource of the plurality of resources using the resource dependency logic, the failure of the at least one failed resource being one of an internal failure or a failure of one or more dependencies of the resource, the impact of the failure determined by:

assigning a resource status value to the failed resource indicative of the failure by evaluating each dependency separately, including evaluating each independent dependency separately and each group of redundant dependencies as a single independent dependency, wherein only if each independent dependency is available is the dependency satisfied, and wherein a single operational resource of each group of redundant dependencies, the group of redundant dependencies being a plurality of resources upon which the selected resource depends, is sufficient to satisfy operational conditions for the selected resource;

evaluating a status of one or more resources of the plurality of resources using the resource status value of the failed resource, wherein the status of the independent dependencies is evaluated by performing a "max( )" or logical "OR" operation on the values of the status values of the resources identified as independent dependencies, thus identifying whether any of the independent dependencies are in a failure state and wherein the status of the redundant dependencies is evaluated by performing a "min( )" or logical "AND" operation on each set of values which are redundant with one another; and determining the impact based on the evaluated status;

determining, based on the impact of the failure, a remediation plan for addressing the failure, wherein in an instance in which the failed resource has suffered an internal failure, the remediation plan is generated comprising limiting the impact of the failure by identifying alternative resources that can be enabled or repurposed to fill a role of the failed resource, and wherein in an instance in which the failed resource is determined to have failed due to a failure of one or more dependencies, determining which dependency has caused the failure, wherein the determination of which dependency caused the failure includes examining the failed dependency to determine whether the failed dependency failed due to one of its own dependencies, or if the failed dependency suffered an internal failure; and providing the remediation plan via a resource dependency planning interface.

2. The method of claim 1, wherein the remediation plan is provided in response to selection of an icon associated with the failed at least one resource from within the resource dependency planning interface.

3. The method of claim 1, further comprising providing a logic editing interface to edit the resource dependency logic.

4. The method of claim 3, further comprising:
receiving a modification to the resource dependency logic via the logic editing interface; and
updating the impact of the failure based on the modification to the resource dependency logic.

5. The method of claim 1, wherein the failure is identified based on a failure of one or more dependencies upon which the failed resource depends.

6. The method of claim 5, wherein the remediation plan comprises procedures for addressing the failure of the one or more dependencies upon which the failed resource depends.

7. The method of claim 1, wherein the resource input data comprises information provided by one or more facility sensors.

8. The method of claim 1, wherein the failure is identified as an internal failure of the failed resource, and wherein the remediation plan further comprises at least one of procedures for repairing the failed resource or procedures for replacing the failed resource.

9. The method of claim 1, wherein the resource input data is provided via the resource dependency planning interface.

10. An apparatus for resource dependency planning comprising at least one memory coupled to at least one processor, the at least one memory comprising instructions that, when executed by the processor, cause the processor to configure the apparatus to:

receive resource dependency logic, the resource dependency logic defining a dependency relationship among a plurality of resources, the plurality of resources being a combination of one or more of equipment, components, devices, systems, functionalities, a component of a particular equipment, a system enabled by one or more pieces of equipment, or a functionality enabled by one or more systems, wherein each resource is configured to provide a dynamic resource status, in real-time, via at least one of one or more facility sensors or one or more attached sensors;

receive a set of resource input data, from at least one of the one or more facility sensors or the one or more attached sensors, in real-time, the resource input data indicating a failure of at least one of the plurality of resources;

determine an impact of the failure on at least one failed resource of the plurality of resources using the resource dependency logic, the failure of the at least one failed resource being one of an internal failure or a failure of one or more dependencies of the resource, the impact of the failure determined by:

assigning a resource status value to the failed resource indicative of the failure by evaluating each dependency separately, including evaluating each independent dependency separately and each group of redundant dependencies as a single independent dependency, wherein only if each independent dependency is available is the dependency satisfied, and wherein a single operational resource of each group of redundant dependencies, the group of redundant dependencies being a plurality of resources upon which the selected resource depends, is sufficient to satisfy operational conditions for the selected resource;

evaluating a status of one or more resources of the plurality of resources using the resource status value of the failed resource, wherein the status of the independent dependencies is evaluated by performing a "max( )" or logical "OR" operation on the values of the status values of the resources identified as independent dependencies, thus identifying whether any of the independent dependencies are in a failure state and wherein the status of the redundant dependencies is evaluated by performing a "min( )" or logical "AND" operation on each set of values which are redundant with one another; and determining the impact based on the evaluated status;

determine, based on the impact of the failure, a remediation plan for addressing the failure, wherein in an instance in which the failed resource has suffered an internal failure, the remediation plan is generated comprising limiting the impact of the failure by identifying alternative resources that can be enabled or repurposed to fill a role of the failed resource, and wherein in an instance in which the failed resource is determined to have failed due to a failure of one or more dependencies, determining which dependency has caused the failure, wherein the determination of which dependency caused the failure includes examining the failed dependency to determine whether the failed dependency failed due to one of its own dependencies, or if the failed dependency suffered an internal failure; and provide the remediation plan via a resource dependency planning interface.

11. The apparatus of claim 10, wherein the remediation plan is provided in response to selection of an icon associated with the failed at least one resource from within the resource dependency planning interface.

12. The apparatus of claim 10, wherein the instructions further cause the processor to configure the apparatus to provide a logic editing interface to edit the resource dependency logic.

13. The apparatus of claim 12, wherein the instructions further cause the processor to configure the apparatus to:
receive a modification to the resource dependency logic via the logic editing interface; and
update the impact of the failure based on the modification to the resource dependency logic.

14. The apparatus of claim 10, wherein the failure is identified based on a failure of one or more dependencies upon which the failed resource depends.

15. The apparatus of claim 14, wherein the remediation plan comprises procedures for addressing the failure of the one or more dependencies upon which the failed resource depends.

16. The apparatus of claim 10, wherein the resource input data comprises information provided by one or more facility sensors.

17. The apparatus of claim 10, wherein the failure is identified as an internal failure of the failed resource, and wherein the remediation plan further comprises at least one of procedures for repairing the failed resource or procedures for replacing the failed resource.

18. The apparatus of claim 10, wherein the resource input data is provided via the resource dependency planning interface.

19. A non-transitory computer readable storage medium comprising computer-readable instructions that, when executed by a processor, cause the processor to configure an apparatus to:
receive resource dependency logic, the resource dependency logic defining a dependency relationship among a plurality of resources, the plurality of resources being a combination of one or more of equipment, components, devices, systems, functionalities, a component of a particular equipment, a system enabled by one or more pieces of equipment, or a functionality enabled by one or more systems,
wherein each resource is configured to provide a dynamic resource status, in real-time, via at least one of one or more facility sensors or one or more attached sensors;
receive a set of resource input data, from at least one of the one or more facility sensors or the one or more attached sensors, in real-time, the resource input data indicating a failure of at least one of the plurality of resources;
determine an impact of the failure on at least one failed resource of the plurality of resources using the resource dependency logic, the failure of the at least one failed resource being one of an internal failure or a failure of one or more dependencies of the resource, the impact of the failure determined by:
assigning a resource status value to the failed resource indicative of the failure by evaluating each dependency separately, including evaluating each independent dependency separately and each group of redundant dependencies as a single independent dependency,
wherein only if each independent dependency is available is the dependency satisfied, and wherein a single operational resource of each group of redundant dependencies, the group of redundant dependencies being a plurality of resources upon which the selected resource depends, is sufficient to satisfy operational conditions for the selected resource;
evaluating a status of one or more resources of the plurality of resources using the resource status value of the failed resource, wherein the status of the independent dependencies is evaluated by performing a "max( )" or logical "OR" operation on the values of the status values of the resources identified as independent dependencies, thus identifying whether any of the independent dependencies are in a failure state and wherein the status of the redundant dependencies is evaluated by performing a "min( )" or logical "AND" operation on each set of values which are redundant with one another; and
determining the impact based on the evaluated status;
determine, based on the impact of the failure, a remediation plan for addressing the failure, wherein in an instance in which the failed resource has suffered an internal failure, the remediation plan is generated comprising limiting the impact of the failure by identifying alternative resources that can be enabled or repurposed to fill a role of the failed resource, and wherein in an instance in which the failed resource is determined to have failed due to a failure of one or more dependencies, determining which dependency has caused the failure, wherein the determination of which dependency caused the failure includes examining the failed dependency to determine whether the failed dependency failed due to one of its own dependencies, or if the failed dependency suffered an internal failure; and
provide the remediation plan via a resource dependency planning interface.

20. The computer readable storage medium of claim 19, wherein the remediation plan is provided in response to selection of an icon associated with the failed at least one resource from within the resource dependency planning interface.

21. The computer readable storage medium of claim 19, wherein the instructions further cause the processor to configure the apparatus to provide a logic editing interface to edit the resource dependency logic.

22. The computer readable storage medium of claim 21, wherein the instructions further cause the processor to configure the apparatus to:
receive a modification to the resource dependency logic via the logic editing interface; and update the impact of the failure based on the modification to the resource dependency logic.

23. The computer readable storage medium of claim 19, wherein the failure is identified based on a failure of one or more dependencies upon which the failed resource depends.

24. The computer readable storage medium of claim 23, wherein the remediation plan comprises procedures for addressing the failure of the one or more dependencies upon which the failed resource depends.

25. The computer readable storage medium of claim 19, wherein the resource input data comprises information provided by one or more facility sensors.

26. The computer readable storage medium of claim 19, wherein the failure is identified as an internal failure of the failed resource, and wherein the remediation plan further comprises at least one of procedures for repairing the failed resource or procedures for replacing the failed resource.

27. The computer readable storage medium of claim 19, wherein the resource input data is provided via the resource dependency planning interface.

\* \* \* \* \*